United States Patent Office 3,679,465
Patented July 25, 1972

3,679,465
PROCESS FOR PRODUCING HARDENABLE EPOXY RESIN COMPOSITIONS
Robert Flynn, Toms River, N.J., assignor to Ciba-Geigy Corporation, Ardsley, N.Y.
No Drawing. Continuation-in-part of abandoned application Ser. No. 877,477, Nov. 17, 1969. This application Nov. 23, 1970, Ser. No. 83,626
Int. Cl. C03c 25/02
U.S. Cl. 117—126 GE                    9 Claims

ABSTRACT OF THE DISCLOSURE

A process for producing epoxide compositions useful in a variety of applications especially in compression molding is disclosed. A low-boiling single or formulated solvent is used to dissolve the appropriate resin and a curing agent therefor and said solution used to coat or impregnate a suitable reinforcement material, preferably a continuous roving type. The solvent is then driven off under conditions which by virtue of the nature of the solvent permit solvent evaporation without a substantial precuring of epoxy resin.

---

This invention relates to the fabrication of polymerizable reinforced resin compositions. More particularly, the invention relates to the preparation of reinforced epoxy resin compositions of highly reactive components which possess improved handling and processing characteristics and which when cured possess excellent mechanical strength properties.

CROSS-REFERENCE TO RELATED APPLICATIONS

This application is a continuation-in-part of U.S. Ser. No. 877,477, filed Nov. 17, 1969, and now abandoned.

BACKGROUND OF THE INVENTION

Compositions containing epoxy resins are cured by reacting the epoxy resin at elevated temperatures with a suitable curing agent to cause the resin to polymerize. Such polymerized epoxides have come into wide use for a variety of applications. The nature of these applications dictates in a large measure what additional ingredients, if any, are provided within the curable epoxy composition. Thus, in addition to the curing agent, the composition may contain colorants, modifiers, reinforcement, fillers, accelerators and the like.

Since the end product is a result of a chemical reaction between the curing agent and the resin, it will be appreciated that the co-presence of these reactive components in admixture can potentially cause serious problems. This is especially so where the technique used to prepare the composition involves conditions approaching and even surpassing those of the curing conditions. The problem is particularly troublesome in producing epoxy compositions suitable for molding applications.

Epoxy molding compounds are thermosetting systems formulated to meet various processing techniques and applications requirements. They usually include the resin and the curing agent and extenders or reinforcements. These latter materials are virtually indispensable in many applications; and where used, the problem the art faces is in providing the resin, the curing agent and the reinforcement together in a stable system which can subsequently be transformed into desired articles by curing in, for example, a compression or transfer molding process. A simple blending technique is not suitable because the reinforcement material must be used as relatively large particles to perform well. The presently available methods for producing curable reinforced resin compositions generally involve coating or impregnating a suitable reinforcement material with the resin and its curing agent. These techniques, however, suffer from one or more disadvantages which render them unsuitable for producing compositions from highly reactive components such as epoxy materials.

In the conventional methods employed, the elevated temperatures required during the process of coating or impregnating the reinforcement with the resin and curing agent are in the range of the temperatures used for actual molding and hence the resin and the curing agent react to an unsuitable degree. While this reaction may be very slow and relatively incomplete, depending on the particular materials used, in general the characteristics of the composition are so deleteriously affected that in many instances the final product is practically worthless.

One such process, for example, the so-called hot melt process, has been employed using resins and curing agents having low melting points. The materials are melted at an elevated temperature and the reinforcement material blended into the hot melt. The degree to which the material is coated by the resin and curing agent (and thus the ultimate properties of the final composition) is in part a function of the system's viscosity. This in turn is a function of the melt characteristics of the resin and curing system and the fabrication temperature used. Additionally, resins and curing agents having both low melting points and widely useful characteristics as final products are not generally known. Therefore, this particular method has drawbacks which render it unsuitable for making epoxy molding compounds.

Another technique involves the use of systems which are liquid per se as liquid resins and curing agents as direct coatings on reinforcement material. This system, like the hot melt system, is not of broad base use however since after coating, the epoxy system must be advanced, i.e. cured so as to yield a solid tack-free composite at room temperature. This requires controlled curing in order to produce a uniform composite with attendant expenses of process control. Finally, a variety of liquid resins and curing agents is not widely available and thus the art is not presented with a generally suitable technique.

Yet another technique has involved the use of a solvent to reduce the viscosity of either liquid systems or to solubilize solid resin/curing agent systems with subsequent application of the resulting liquid to the reinforcement material. This approach is in fairly wide use in producing phenolic or polyester resins. The technique, however, has not been successfully applied to epoxy systems owing to a variety of factors.

Typically, this approach involves dissolving the resin and curing agent in a solvent, applying this solution somehow to reinforcement material such as roving, for example, and then removing the solvent to leave behind a resin/curing agent system. The major problem is in removing the solvent so as to leave a resin/curing agent composition which will have desirable physical properties when molded. On the one hand, high temperature solvent removal causes epoxy systems to advance or pre-cure at a point in time when this is intolerable. On the other hand, low temperature solvent removal often results in rapid removal of solvent from the surface of the coating while remaining solvent below the surface is prevented from evaporating by the solid skin that forms on the surface. This is quite a serious problem in processes where the resin system is being applied continuously to filamentous or fibrous materials such as roving or gauze and the like. In any case, compositions produced from such material generally fail to have acceptable mechanical or electrical properties in one respect or another.

SUMMARY OF THE INVENTION

The present invention has relevance in those systems wherein curable epoxy resin compositions are applied to continuous reinforcement material. It has particular use in preparing reinforced epoxy resin systems for use in compression molding applications, especially where the reinforcement material is a filamentous or fibrous roving. The process of the invention therefore comprises impregnating a suitable reinforcement material with an epoxy solution system comprising the desired epoxy resin, a curing agent therefor, and a low boiling single or formulated solvent system, and subjecting the impregnated reinforcement material to high energy conditions for a time sufficient to remove substantially all of said solvent, without appreciably effecting the cure of said resin.

There results from such a process a coated strand or roll of reinforcement material containing the hardenable resin as a solid tack-free coating. Ordinarily, the product is then chopped into small staple lengths and used directly as the raw material in a compression mold. The product produced by the process of this invention has good flow and handling characteristics and has about half of the bulk density of anything currently available. Upon heating in the mold, the reactive components, i.e. the resin, curing agent and other materials such as accelerators and the like, chemically react to form the cured final product. Pipe fittings such as elbows, flanges, tees, bushings and the like for use in high pressure fluid flow systems such as petroleum lines are typical of materials which can be made by using the product of the invention. In addition, the materials also have good electrical properties and are thus useful in a variety of electrical applications.

The epoxy solution system

It is believed that the solution method of preparing reinforced compositions has never been achieved to any satisfactory degree. This is due in part, at least, to the difficulty encountered in economically removing the solvent from the reinforced material without causing the highly reactive components of the epoxy system to react.

The present invention is based on the discovery that a low boiling single or formulated solvent system used in conjunction with a high energy rapid drying step will absorb most of the energy of the drying step as the solvent evaporates, with very little, if any, energy being diverted to the undesirable premature curing or "B" staging reaction. Solvents found to be suitable for this purpose are solvents having a low boiling point at atmospheric pressure, preferably in the range of 50° C. to 90° C. and preferably 55° C. to 80° C. Eminently suitable are acetone and methyl ethyl ketone with acetone being preferred.

In addition, low boiling mixtures of solvents can be used in the process of the invention as a formulated solvent system. When employed, such solvent systems should have their boiling points within the above ranges. When employed, those formulated solvent systems which have a relatively gradual increasing time-temperature response curve in a controlled distillation test over the temperature range indicated are especially preferred.

A formulated solvent system found to be quite suitable in the present invention is one comprising acetone, dimethylformamide and water. Preferably, the system contains a major amount of acetone, that is over 50% by weight, with lesser amounts of water and dimethylformamide. Of these latter two, the water is used in an amount less than the dimethylformamide. Best results are obtained with a solvent system containing from 85–95% of acetone, 4–12% dimethylformamide and 1–3% of water, all percents by weight. In carrying out the process of the invention it is actually preferred to use a single low boiling solvent and acetone is most preferred in this regard.

In producing the epoxy resin solution employed in the invention, virtually any epoxy resin normally employed in the production of cured products may be used. The actual ones selected will depend upon the properties desired in the final product, and this is largely within the discretion of the user. While the invention is especially useful in treating highly reactive resins, i.e. those with several epoxide groups per molecule, it is also suitable to employ epoxy compounds containing two or more epoxy groups. The resins may be aliphatic, cycloaliphatic, aromatic, and the like, and may carry inert substituents such as chlorine and others well-known and encountered in the art. They may be monomers or polymers, and they may also contain ether linkages and ester groups as well. Especially preferred are epoxides prepared from bisphenol A, (2,2-bis[4-hydroxyphenyl] propane) phenols or cresols and epichlorhydrin. Virtually any epoxide produced from a polyhydric alcohol and epichlorhydrin may be used. Typical epoxides are those produced from epichlorhydrin and a polyhydric phenol or alcohols such as resorcinol, catechol, 1,2,6-hexanetriol, sorbitol, mannitol, pentaerythritol, trimethylolpropane, and glycerol allyl ether. Similarly, polymeric materials containing polyhydric hydroxyls such as appropriately substituted polyethers and polyesters may likewise be employed. For example, there may be employed vinyl cyclohexene dioxide, epoxidized mono-, di- and triglycerides,
butadiene dioxide,
1,4-bis(2,3-epoxypropoxy) benzene,
1,3-bis(2,3-epoxypropoxy) benzene,
4,4'-bis(2,3-epoxypropoxy) diphenyl ether,
1,8-bis(2,3-epoxypropoxy) octane,
1,4-bis(2,3-epoxypropoxy) cyclohexane,
4,4'-bis(2-hydroxy-3,4-epoxybutoxy) diphenyldimethylmethane,
1,3-bis(4,5-epoxypentoxy)-5-chlorobenzene,
1,4-bis(3,4-epoxybutoxy)-2-chlorocyclohexane,
diglycidyl thioether,
diglycidyl ether,
ethylene glycol,
diglycidyl ether,
resorcinol diglycidyl ether,
1,2,5,6-diepoxyhexane-3,
1,2,5,6-diepoxyhexane, and
1,2,3,4-tetra(2-hydroxy-3,4-epoxybutoxy) butane.

Especially suitable are bisphenol A-epichlorhydrin polyepoxide resins of the formula

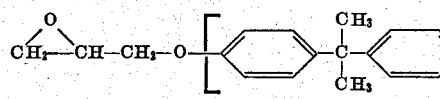

and epoxidized poly(o-cresols) of the formula

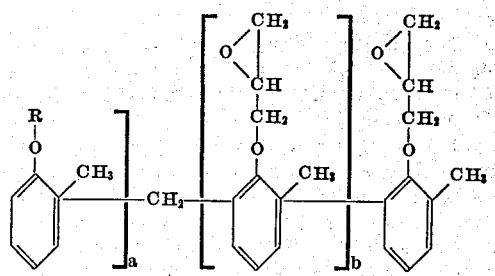

wherein $n$, $a$ and $b$ are positive numbers and R represents chlorohydrins, glycols, polymeric ether linkages and the like.

The curing agents used to effect the ultimate cure of the resin are those normally employed in the art. They may be conventional hardeners, accelerators or the like which produce polymerization of a polyepoxide resin by reaction of the oxirane ring. Typically employed are primary and secondary amines, amides, polyamines and polyamides, phenols, novolacs and acid anhydrides.

The curing agents may be used singularly or in combination of two or more. The amount used may range from 80%–150% of the stoichiometric amount although the actual amount may vary from this range depending upon the particular composition which is to be cured. For purposes of stoichiometric calculations, one epoxy group is considered to react with one reactive hydrogen.

Additionally, accelerators may be included in the system. These may be used to increase the speed of reaction between the curing agent and the polyepoxide. Additionally, some accelerators may have a primary effect as a curing agent per se. Typical compounds are dicyandiamide (cyanoguanidine), benzoguanamine, imidazole, isoniazide, tetramethyl diamine, benzyl dimethylamine, metaphenolene diamine and N,N,N',N'-tetramethyl-1,3-butadiamine (TMBDA). The amount of accelerator is usually less than the amount of primary curing agent. As little as 0.1% ranging to the stoichiometric amount based on the weight of the polyepoxide, can be used to accelerate the curing reaction as a practical rate. The actual amount of accelerator used, however, will depend upon the composition which is to be cured.

In practicing the process of the invention, the amount of the resin system (i.e. resin, curing agent and other solute materials) used in the solvent system may vary. It is convenient and preferred to use from 40 to 75 parts by weight of solvent and 25 to 60 parts by weight of the resin and any associated curing materials. In preparing the epoxy resin solution, the concentration of the solutes should be such as to provide a solution of conveniently handled viscosity. It has been found that the above ranges are adequate for this purpose.

The reinforcement material

Virtually any reinforcement material amenable to continuous flows through a bath solution can be employed in the process of the invention such as cloth, tape or roving. Particularly suitable are filamentous materials such as fibreglass, graphite, boron, synthetic fibres typified by nylon, Dacron and Orlon. It is most preferred to use these in the form of stranded rovings and typically the process is carried out by continuously passing the roving through the epoxy resin solution at a speed sufficient to pick up on the roving the desired amount of solution. This speed, of course, will vary with the reinforcement material used, the number of ends per strand and the number of filaments per end, the tension on the reinforcement material as it passes through the solution, the viscosity of the epoxy resin solution and like factors apparent to those skilled in the art. With regard to tension, it will be appreciated that the extent of coating on any material having closely packed filaments and ends will depend to some extent on the tautness of the strand as it passes through the resin solution. It has been discovered that best results are obtained in the ultimate compositions when from about 20 to 60% of the weight of the coated reinforcement material is constituted by the dry epoxy resin system coating. It will be appreciated by those skilled in the art that the amount of impregnation, of resin system (considered as a solid) applied on the reinforcement, can be varied by altering a number of the process parameters such as those indicated above. In the preferred form of the invention, fibreglass roving containing 15 to 30 ends per strand and 204 filaments per end will pick up a desired amount of resin material from the resin system moving at a speed of from 5 to 20 feet per minute through the solution.

High energy drying

After the reinforcement material has been coated to the desired level, the now solvent-wet composite is subjected to high energy drying to remove the solvent substantially completely and to leave behind the resin/curing agent solid system in a virtually unadvanced state. By "substantially completely" is meant removal of sufficient solvent to leave a non-tacky resin system on the reinforcement. While the relative amount of solvent removed will vary with the particular epoxy system used and the end use of the product, it is suitable if the final dried composite contains less than 1% and preferably less than 0.5% volatiles for molding compositions based on the entire weight of dried composite.

The particular temperature used in achieving solvent removal is dependent upon and will vary with the dwell time of the coated reinforcement material under the energy conditions used. The combination of time and temperature should not be so great as to appreciably effect the curing of the resin. Yet these parameters should not be so low in magnitude as to result in incomplete solvent removal. The temperatures normally employed are in excess of subsequent molding temperatures and it is indeed surprising that such low pre-curing is obtained under these conditions. In fact, the present process permits very high temperature exposure of the curable system and results in less curing than is experienced with any other technique. While what constitutes "appreciably curing" may vary wit the system and end result sought, it is sufficient to say that quite low pre-curings are obtained in the present process. For example, for most molding applications, the resin system will not be considered to be appreciably cured if there remains, after solvent removal, more than about 50% of the total epoxy groups originally available for curing.

In the preferred mode of practicing the invention, curings of 15% or less can be routinely obtained using temperatures of at least 150° C. preferably of from about 150–500° C., and most preferably 300 to 450° C. when acetone is used alone, for reinforcement dwell times of about 0.3 to 1.2 minutes, higher temperatures requiring shorter dwell times. The higher temperatures are preferred. Indeed temperatures above those indicated may be employed with proper adjustment of dwell times. For a six foot, heated column used as a drying tower this corresponds to reinforcement speed rates of from 5–20 ft./min. In many instances, it is desirable to divide the drying tower into several sections, three for example, and provide gradually reducing temperatures. Thus, for example, that portion of the tower first encountered by the coated material could be set at the appropriate temperature with subsequent decreases in the temperature of other sections depending upon desired results. Additionally, it has been found convenient to direct forced air as a cooling medium into the coated material as it leaves the drying column. It is also helpful in many cases to have a flow of air or nitrogen running through the column to aid in removal of the vaporized solvent.

Following the drying step, the coated reinforcement is normally collected and chopped into small staples in a manner well known. Compression molded articles are then prepared by known techniques. As a result of the invention, the preparation of such articles is facilitated by the very desirable flow and handling properties of the reinforced material. The physical properties of the final molded products are similarly quite good, possessing higher tensile strengths, generally above 20,000 p.s.i., and improved percent elongation, as compared to other fabricating techniques. The invention thus provides a method for handling epoxy systems heretofore considered to be too sensitive for the preparation of reinforced moldable compositions. All this is achievable without sacrificing any of the normally desirable characteristics of molding compounds. That is, the materials produced in this invention can be compression molded, for example, using low mold close times (usually 5–10 minutes) at standard curing temperatures and mold pressures.

The following examples are given to illustrate specific embodiments of the invention. In each example, unless otherwise indicated, the following procedure was used.

A fibreglass roving was continuously passed at room temperature through a bath of an epoxy resin solution containing an epoxy resin, a curing agent and other ingredients as indicated, at the designed speed and tension. The roving picked up resin solution from the bath and was directed out of the bath and into the bottom of a vertical six foot drying column. The column was divided into three 2-foot sections heated as indicated. As the coated roving left the drying tower, it was cooled with forced air and introduced into a chopper where it was chopped into 0.5″ staple lengths. The chopped material was then compression molded and gave item having the indicated properties.

EXAMPLE I

Epoxy resin solution (40% solid):       Grams
    Araldite 7065 [1] _____ 1200
    Aniline/formaldehyde curing agent [2] _____ 138
    Acetone _____ 1800
    Dimethyl formamide _____ 168
    Water _____ 36

Reinforcement material:
    Fibre glass roving—30 end strand (204 filaments/end)
    Roving speed—10 ft./min.
    Roving tension—900 grams
    Tower temperature—bottom sector 340° C.; middle sector 325° C.; top sector 300° C.

[1] Araldite 7065 is a bisphenol A-type of epoxy resin prepared from epichlorhydrin and has the formula hereinabove previously set forth. It has an epoxy value average of 0.21 equivalent per 100 grams and is available from Ciba Corporation, Summit, N.J.

[2] Curing agent—an aniline/formaldehyde resin (mol ratio 1/0.624) prepared by adding a mixture of 608 parts of 37.0% formaldehyde and 690 parts of 31% HCl to 1118 parts of aniline preheated to 60° C. During its addition the mixture is agitated and the temperature is maintained at 90° C. After addition, the temperature is maintained at 80° C. until the formaldehyde is completely consumed (about 2 hours). Thereafter, 540 parts of 50% sodium hydroxide is added, the aqueous layer separated and the resin washed with water at 80° C. until the pH of the wash water is 7.5. Volatiles are then removed under vacuum to 130° C. at 20 mm. Hg.

Under the above conditions, a roving was obtained having 37.3% of its weight attributable to the resin system (resin pickup). The percent volatiles remaining in the dried roving was 0.26. The degree of advancement was determined by evaluating the epoxy value [1] of the raw material (resin plus curing agent) and comparing it to other epoxy value of the dried coating on the roving. The raw material had an epoxy value of 0.21 per 100 grams of system (i.e. resin plus hardener), whereas the dried coating had an average value of 0.10 per gram of dried coating. Thus, no appreciable curing of the resin (less than 50%) was effected by the process.

Material produced in the same fashion as the above using the same formulation but changing roving speed to 9.4 ft./min. and the tension to 800 grams was molded into 2″ 90° elbows, using conventional molding equipment. The mold close time was about 4 minutes with a molding temperature range of 340–380° F. using a clamp pressure of 2000 p.s.i. on a 14″ ram and 1700 p.s.i. cone pressure on a 1¾″ ram (around 4 minutes). The elbow had a hydrostatic burst pressure of 2460±219 p.s.i.

It can be seen from the above results that the process of the invention yields moldable compositions of exemplary physical characteristics especially suitable for high pressure fluid flow systems. It does so using a very reactive epoxy resin/curing agent system. For example, the above epoxy resin solution gels in about 176–183 seconds at 172° C.

[1] Epoxy value is defined as the fractional number of epoxy groups per 1000 grams of material tested and is determined by dissolving the material in a minimum amount of acetone, adding benzyl alcohol and a water solution of bromophenol blue and potassium iodide bringing to reflux temperature and titrating with 0.5 N hydrochloric acid.

EXAMPLE II

The procedure of Example I was used in three additional runs to demonstrate the effect of drying temperature variations.

|  | A | B |
|---|---|---|
| Roving rate, ft./min. | 7.0 | 20.0 |
| Roving tension, grams | 800 | 800 |
| Tower temperature ° C.: |  |  |
|   Bottom | 290 | 440 |
|   Middle | 275 | 425 |
|   Top | 250 | 400 |
| Percent: |  |  |
|   Volatiles remaining | 0.3 | 0.3 |
|   Resin pickup | 33.3 | 36.9 |

The final product was molded into ASTM Type I tensile bars at a molding temperature of 360° F., mold close time of 5 minutes with a 2 hour post cure at 300° F. and had the following properties:

| | | |
|---|---|---|
| Tensile strength at 25° C., p.s.i. | 21,400 | 23,700 |
| Percent elongation at failure | 0.52 | 0.64 |

The above materials are thus eminently suited for pipe fittings applications.

EXAMPLE III

The procedure of Example I is followed varying the formulation and conditions as follows with the indicated results.

Formulation:       Grams
    Araldite 7065 _____ 1200
    Dicyandiamide (hardener) _____ 48
    N,N,N',N' - tetramethyl - 1,3 - butadiamine (TMBDA) (accelerator) _____ 3
    Acetone _____ 1660
    Water _____ 36
    Dimethylformamide _____ 168

Reinforcemental material:
    Fibre glass roving—15 end strand
    Roving speed—15 ft./min.
    Roving tension—800–900 grams
    Percent resin pickup—32.50

The above materials were molded into (a) a 2″, 90° elbow at 360–380° F. and 2000 p.s.i. compression pressure on a 14″ ram and a 1700 p.s.i. core pressure on 1¾ ram, (b) a standard ASTM Type I tensile bar (cured at 360° F. and 1.5 ton pressure until gelled, followed by 4 tons pressure until cured), at a mold close time of 5 minutes (post cure 2 hours at 300° F.). The elbow had an average burst value of 3030±202 p.s.i. (hydrostatic pressure) which constitutes an excellent material for high pressure fluid flow. The tensile bar exhibited at tensile strength at 25° C. of 26,500 p.s.i. and a percent elongation at failure of 0.72.

EXAMPLE IV

The procedure of Example III is followed using one gram of imidazole as an accelerator instead of the TMBDA. Percent resin pickup was 32.7. An ASTM Type I tensile specimen was prepared as described in Example III and shown to possess a tensile strength of 25,400 p.s.i. at 25° C. and a percent elongation of 0.71. Several 2″, 90° elbows were molded under conditions similar to those in Example III (Cure Temperature 350–360° F.) and shown to possess an average hydrostatic burst pressure of 2,580±533 p.s.i.

EXAMPLE V

The procedure of Example I was used varying the conditions and formulatoins as follows with the indicated results:

| Formulation | A | B | C |
|---|---|---|---|
| Araldite 7065 | 1,200 | 600 | 0 |
| ECN 1280 [1] | 0 | 600 | 1,200 |
| Dicyandiamine | 48 | 72 | 96 |
| Benzyl dimethylamine (accelerator) | 6.2 | 5.0 | 3.8 |
| Water | 36 | 54 | 72 |
| Acetone | 1,660 | 1,603.2 | 1,538 |
| Dimethyl formamide | 168 | 252 | 337 |
| Percent solids content (calculated) | 40 | 40 | 40 |
| Roving tension, gram | 900–1,000 | 900–1,000 | 900–1,000 |
| Roving rate, ft./min | 10.5 | 10.9 | 10.0 |
| Resin pickup | 36.7 | 36.5 | 35.0 |
| Percent volatiles remaining | 0.41 | 0.53 | 0.68 |
| Tensile strength, p.s.i. at 25° C. (ASTM Type I) | 25,600 | 22,500 | 15,400 |
| Percent elongation at failure | 0.69 | 0.61 | 0.67 |

[1] ECN 1280 is an epoxidized poly(o-cresol) resin having the formula hereinabove stated and a melting point of approximately 80° C. It is available from CIBA Corporation, Summit, N.J.

Each of the above formulations produces suitable molded articles although C has lower tensile properties. The composition, being produced solely from a highly functional epoxide, offers improved chemical resistance and deflection temperature and is thus useful under a wide variety of conditions.

EXAMPLE VI

The procedure of Example I is followed with the indicated results.

| Formulation | A | B | C |
|---|---|---|---|
| Araldite 7065 (see Example 1), grams | 1,200 | 1,200 | 1,200 |
| Aniline/Formaldehyde curing agent (see Example 1), grams | 138 | 138 | 138 |
| Acetone, grams | 2,050 | 1,805 | 1,805 |
| Water, grams | 0 | 200 | 0 |
| Dimethylformamide | 0 | 0 | 200 |
| Fibreglass roving, end strand | 30 | 30 | 30 |
| Roving rate, ft./min | 11.2 | 9.8 | 10.2 |
| Roving tension, grams | 900 | 900 | 900 |
| Tower temperature ° C.: | | | |
| Bottom | 340 | 340 | 340 |
| Middle | 325 | 325 | 325 |
| Top | 300 | 300 | 300 |
| Percent: | | | |
| Volatiles remaining | 0.2 | 0.2 | 0.3 |
| Resin pickup | 35.4 | 36.4 | 35.7 |

The product obtained from the above procedure, after being cut into 0.5 inch staples, was molded into ASTM Type I tensile bars at a molding temperature of 360° F., mold close time of 5 minutes with a 2 hour post cure at 300° F. and had the following tensile properties:

| | A | B | C |
|---|---|---|---|
| Ultimate strength at 25° C., p.s.i. | 26,000 | 28,100 | 24,800 |
| Percent elongation at failure | 0.73 | 0.72 | 0.59 |

From the above it will be seen that the materials are eminently suited for pipe fittings applications. In addition, it will be appreciated that formulation A, using only acetone as the solvent, permits the use of somewhat higher roving rates through the varnish solution. This is of substantial economic benefit.

Material produced in accordance with formulation A above in routine production runs normally displays a retained epoxy content of from 80 to 90 percent. That is such material is "B" staged only to the extent of 10 to 20% thus indicating an even lesser tendency to advance when compared to the material produced in Example 1. The degree of advancement is measured in accordance with the procedure of Example 1. The raw material epoxy value in formulation A is an average of 0.2 and the epoxy value of the dried material is an average of 0.17.

I claim:

1. A process for producing reinforced, hardenable epoxy compositions which comprises continuously passing a reinforcement material through an epoxy solution system comprising a curable epoxy resin, a curing agent therefor and a low boiling solvent, said solvent boiling in the range between 50° C. and 90° C. thereby to impregnate said reinforcement material with said epoxy solution system, subjecting the impregnated reinforcement material to temperatures of from 300–500° C. for a time sufficient to remove at least 99% of the solvent without appreciably effecting the cure of said epoxy resin.

2. The process of claim 1 wherein said solvent comprises at least 85% by weight of acetone.

3. The process of claim 1 wherein said solvent is a formulated solvent comprising by weight from 1% to 3% of water, from 4% to 12% dimethylformamide and from 85% to 95% acetone.

4. The process of claim 1 wherein the solvent is acetone.

5. The process according to claim 2 wherein the epoxy resin is a 2,2-bis(4-hydroxyphenyl)-propane type of resin.

6. The process according to claim 2 wherein the epoxy resin is an epoxidized poly(o-cresol) type of resin.

7. The process of claim 2 wherein the reinforcement material is fibre glass roving.

8. The process of claim 2 wherein the curing agent is dicyandiamide.

9. The process of claim 2 wherein the curing agent is an aniline/formaldehyde condensation product.

References Cited
UNITED STATES PATENTS

| | | | |
|---|---|---|---|
| 3,523,037 | 8/1970 | Chellis | 117—161 Z B |
| 3,198,850 | 8/1965 | Levantin | 117—161 Z B |
| 3,480,471 | 11/1969 | Rembold | 117—161 Z B |
| 3,578,489 | 5/1971 | Gelb | 117—161 Z B |

WILLIAM D. MARTIN, Primary Examiner

D. COHEN, Assistant Examiner

U.S. Cl. X.R.

117—161 Z B